US005498208A

United States Patent [19]
Braun

[11] Patent Number: 5,498,208
[45] Date of Patent: Mar. 12, 1996

[54] SPEED REDUCING UNIVERSAL JOINT USING PLANETARY GEARS

[75] Inventor: Eric E. Braun, Neenah, Wis.

[73] Assignee: Oshkosh Truck Corporation, Wis.

[21] Appl. No.: 151,221

[22] Filed: Nov. 12, 1993

[51] Int. Cl.$^6$ .................................................. F16D 3/16
[52] U.S. Cl. ........................ 464/109; 464/113; 464/147
[58] Field of Search ................................ 464/109, 106, 464/113, 117, 147; 475/223, 230, 336, 346

[56] References Cited

U.S. PATENT DOCUMENTS

| | | | |
|---|---|---|---|
| 66,052 | 6/1867 | Smith | 464/109 X |
| 1,121,803 | 12/1914 | Coakley | 475/246 |
| 1,389,971 | 9/1921 | Noel | 464/109 |
| 2,235,427 | 3/1941 | Harris | 74/335 |
| 3,001,386 | 9/1961 | King | 464/117 |
| 3,036,446 | 5/1962 | Morgenstern | 64/18 |
| 3,260,070 | 7/1966 | Preston | 64/21 |
| 3,456,458 | 7/1969 | Dixon | 464/109 |
| 3,786,691 | 1/1974 | Lindstrom | 74/473 |
| 3,910,597 | 10/1975 | Seko | 280/150 |
| 4,006,607 | 2/1977 | Kane | 464/109 |
| 4,103,513 | 8/1978 | Grosser | 464/109 |
| 4,315,556 | 2/1982 | Timoney | 180/255 |
| 4,352,276 | 10/1982 | Smith | 464/109 |
| 4,509,932 | 4/1985 | Weible | 464/109 |
| 4,901,599 | 2/1990 | Irwin | 475/230 |
| 5,171,194 | 12/1992 | Shen | 475/230 X |

FOREIGN PATENT DOCUMENTS

| | | |
|---|---|---|
| 970012 | 11/1982 | U.S.S.R. . |
| 1050862 | 10/1983 | U.S.S.R. . |
| 1732055 | 5/1992 | U.S.S.R. ................................ 464/109 |

OTHER PUBLICATIONS

SAE Technical Paper 911777, "New Variations of the Cardan Concept Increase Universal Joint Performance" 1991.
Sketch and portion of service manual for a Mack NW; A8754, Nov. 9, 1990.
Rockwell Engineering Bulletin Hub Reduction Axle Combination, EB-88148 (Sep. 1986).
Department of the Army Operator's Manual, TM 9-2320-206-10, Feb. 1972.

Primary Examiner—Daniel P. Stodola
Assistant Examiner—Thomas E. Dunn
Attorney, Agent, or Firm—Baker & McKenzie

[57] ABSTRACT

A universal joint for the transfer of power between an input shaft and an output shaft. The joint comprises a modified Cardan or Hooke's joint that is driven by four bevel gears. A first bevel gear is mounted to the end of a fixed housing through which the input shaft passes. A drive bevel gear is mounted to the distal end of the input shaft. Two opposing planetary gears are driven by the drive gear and rotate about the fixed gear. The planetary gear axle is connected to an output yoke which is connected to the output shaft. If the drive, fixed and planetary bevel gears are of the same size, a 2:1 speed reduction joint is provided. Variations of the bevel gears sizes may provide input:output ratios ranging from about 2:1 up to about 10:1.

17 Claims, 12 Drawing Sheets

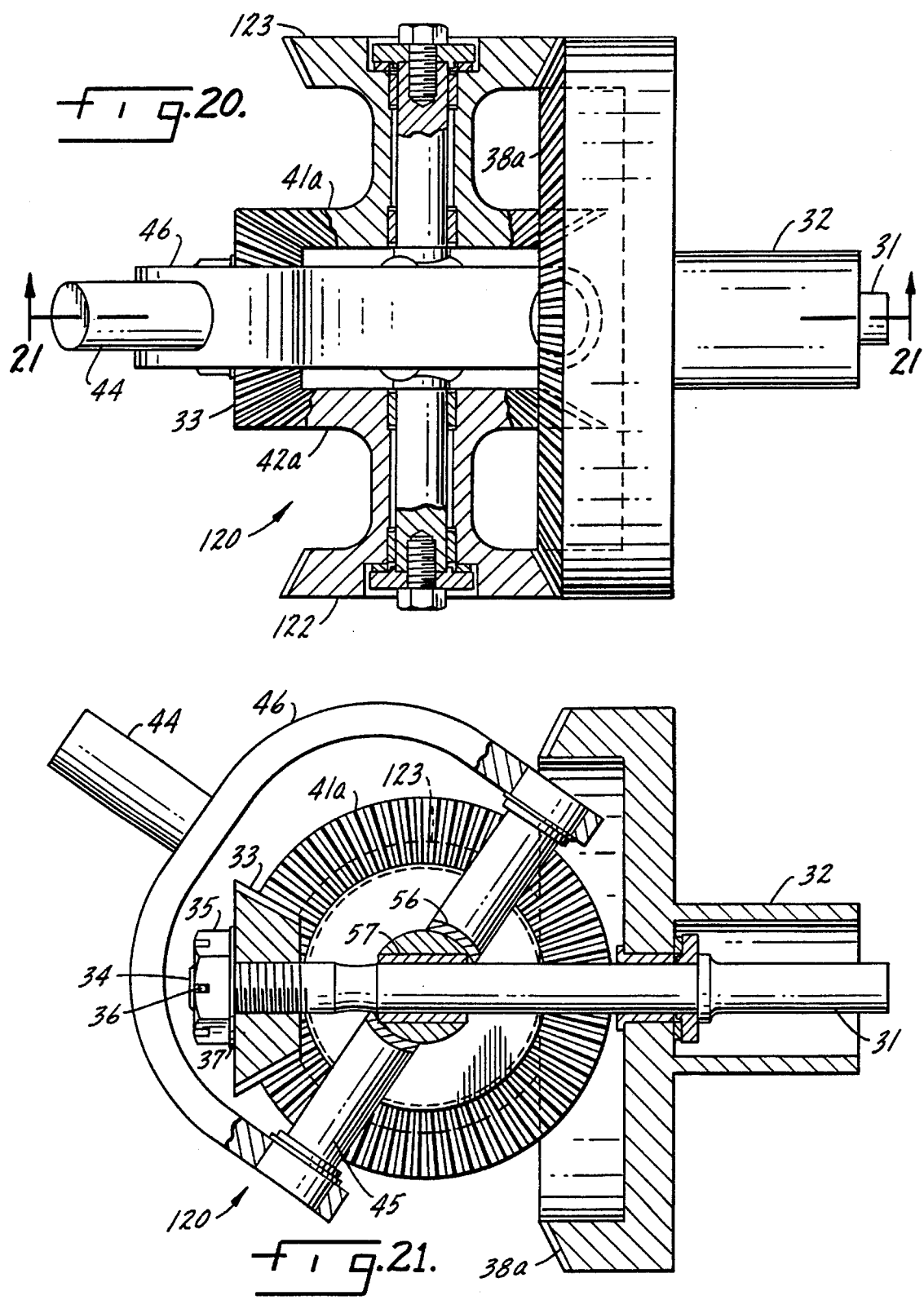

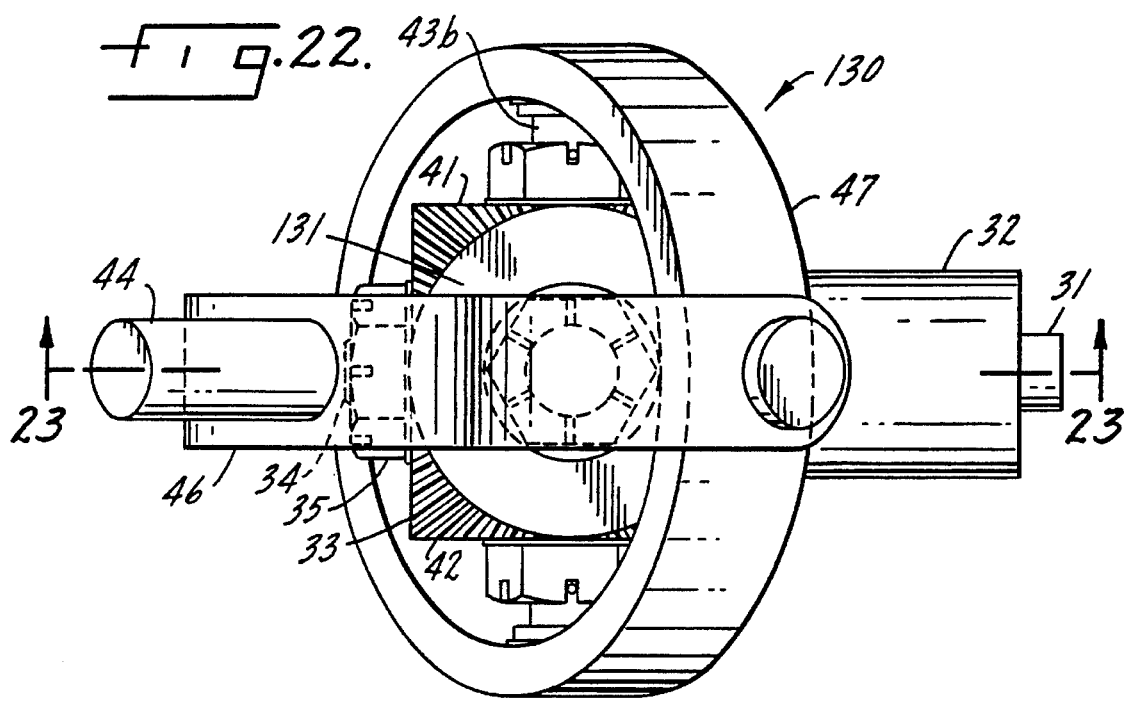
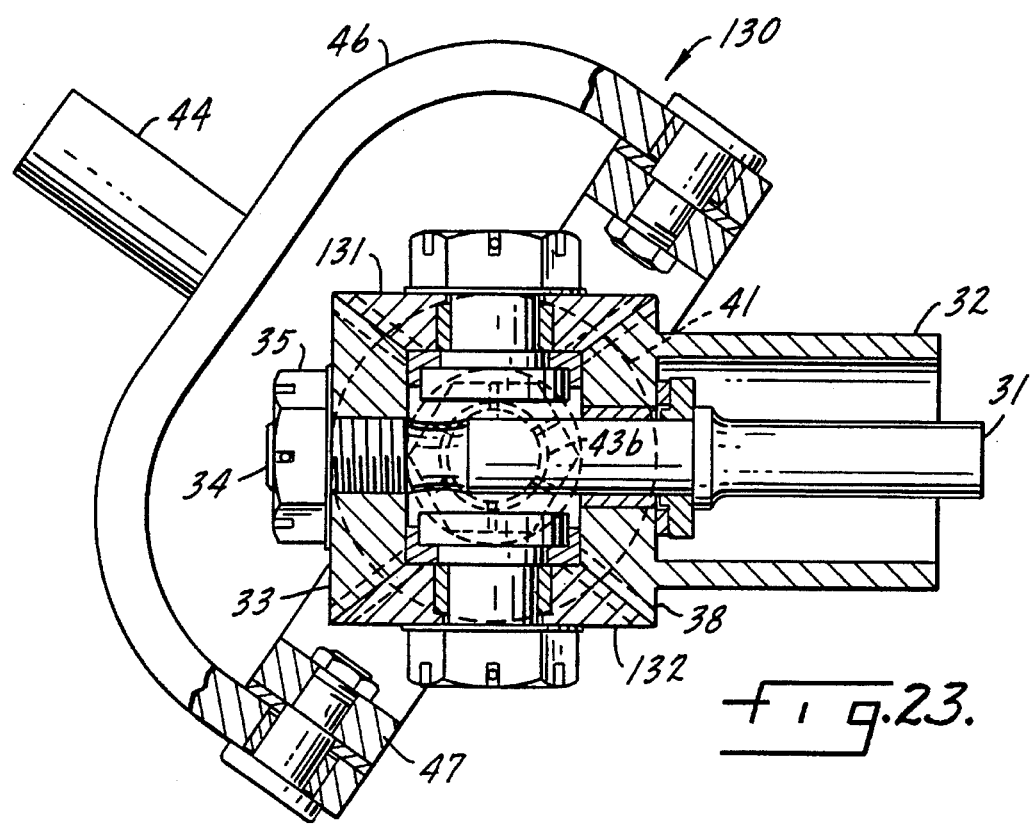

SPEED REDUCING UNIVERSAL JOINT USING PLANETARY GEARS

FIELD OF THE INVENTION

The present invention relates generally to the field of mechanical power transmission equipment and more specifically to the transportation field where rotational power is transferred from an input shaft to an output shaft. Applications of the present invention include drive/steer axle joints, gear box output joints connecting to a drive line, steering system joints connecting a fixed steering column to a steering shaft, in-line joints, steering or drive line systems, joints for independent steerable or independent non-steerable drive wheels. Other applications requiring both a kinematic linkage and speed reduction between an input shaft and an output shaft having an angular misalignment will be apparent to those skilled in the art.

BACKGROUND OF THE INVENTION

The present invention provides an improvement to what is commonly known as a universal joint, a Hooke's joint or a Cardan's joint. All of these joints provide what is known as a kinematic linkage between an input shaft and an output shaft. The kinematic linkage transfers rotational movement of the input shaft to the output shaft. The kinematic linkage provided by these joints can be used to connect two shafts that have an angular misalignment. In other words, the connection between the input and output shaft may be straight or at an angle.

Universal joints, however, do not provide speed reduction across the joint. A separate gear system is required in order to reduce the input rotational velocity if a lower output rotational velocity (and higher output torque) is desired.

Numerous attempts at improving on the general universal joint concept have been made. These attempts include U.S. Pat. No. 2,235,427 to Harris which discloses a pivotally adjustable universal joint, U.S. Pat. Nos. 4,509,932 to Weible and 4,352,276 to Smith which teach universal joints with improved centering members or devices to provide constant output velocity and U.S. Pat. Nos. 4,103,513 to Grosser, 3,036,446 to Morgenstern and 3,260,070 to Preston disclose rolling-contact universal joints for transmitting power from one shaft to another. None of these references, however, disclose an improved universal joint which combines the kinematic linkage of two misaligned shafts (i.e. a universal joint) with speed reduction.

Thus, there is a need for an improved universal joint that enables pivotal movement between the input and output shafts and further providing speed reduction between the input and output shafts. The output shaft angular velocity should preferably be a fraction of the input shaft velocity and the ratio of the input shaft velocity to output shaft velocity should be a function of the structural design of the joint. Such a joint would have significant and broad applications in mechanical power transmission equipment including, but not limited to automotive power transmission componentry such as drive axles, gear boxes, drive hubs, drive shafts and steering systems. The improved joint would save space because it would combine two functions, i.e. pivotal kinematic linkage and gear reduction, that previously required two separate systems, i.e. a universal joint linked to a speed reduction gear system.

SUMMARY OF THE INVENTION

The present invention makes a significant contribution to the mechanical power transmission art by providing an improved universal joint for transmitting power from an input shaft to an output shaft that also reduces angular velocity across the joint. A typical design within the scope of the present invention results in a 2:1 reduction between the input rotational velocity and the output shaft rotational velocity. Other input:output rotational velocities ranging from less than 2:1 to greater than 10:1 are available by modifying gear sizes and coupling arrangements.

The improved universal joint provided by the present invention includes a drive gear mounted on a distal end of an input shaft. A fixed gear is mounted on a distal end of a housing through which the input shaft passes. The fixed gear is mounted on the housing and is disposed inward from the drive gear which is mounted on the distal end of the input shaft. A pair of a planetary gears, connected by a planetary gear axle, are disposed between and simultaneously engage both the fixed and drive gears of the input shaft. The planetary gear axle revolves around the input shaft in the same direction but not at the same speed as the input shaft. In either structure disclosed below, i.e. the drive ring or drive cross embodiments, the output shaft does not include any gears and does not directly engaged any gear disposed on the input shaft. The planetary gears, which are only indirectly connected to the output shaft, engage the fixed and drive gears associated with the input shaft.

The planetary gear axle is also connected to the output shaft. In the preferred embodiment, a secondary axle, which is connected perpendicularly to the planetary gear axle, is also connected to an output yoke which is attached to the distal end of the output shaft. The combination of planetary gear axle and the secondary axle provide a "drive cross". In another embodiment, the distal ends of the planetary gear axle are attached to a "drive ring". The drive ring is then attached to an output yoke or other equivalent structure which is fixedly attached to the distal end of the output shaft. In both the drive ring and drive cross embodiments, the planetary gear axle is pivotally attached to the output shaft thereby enabling the relative angle between the input and output shafts to be varied.

The universal joints described above may be described as single Cardan joints because a single coupling mechanism, i.e. a drive cross or drive ring, couples the input shaft to the output shaft. If the diameters of the fixed and drive gears are equal and the diameters of both planetary gears are equal, the average rotational velocity of the output shaft will be equal to one-half (½) of the rotational velocity of the input shaft. By varying the configuration and diameters of the gears, it is possible to vary the ratio of the input rotational velocity to the output rotational velocity.

As with any single Cardan joint, the present invention, given a constant input rotational velocity, operates with a varying output rotational velocity. The output velocity is a function of the joint operating angle. The output velocity is oscillatory in nature and in the case of the present invention remains oscillatory, but at a reduced speed based on the gear reduction ratio across the joint.

To overcome the problem of oscillatory output velocity, a second Cardan joint can be added in phase with and operating at an equal joint angle with the first Cardan joint to create a double Cardan joint. The second Cardan joint will cancel the oscillatory output velocity of the first joint and provide a true constant output velocity. This double Cardan joint and has the additional benefit of increased angular flexibility over a single Cardan joint. A double Cardan joint made in accordance with the present invention includes a single joint as described above coupled to a basic or single Cardan joint taught by the prior art with a coupling link. Instead of an output yoke being attached to the drive cross or drive ring, a short coupling connects the drive cross or drive ring to a third axle. The third axle is parallel to the second axle which connects the planetary gear axle to the coupling link and is also perpendicular to the planetary gear axle. A fourth axle, perpendicular to the third axle, is connected to an output yoke which is connected to the output shaft.

As discussed above, it is possible to vary the ratio of the input shaft rotational velocity to the output shaft rotational velocity by varying the diameters of the fixed, drive and planetary gears. Compound planetary bevel gears may be used to provide additional ratios of up to 10:1 across the joint. If higher torque carrying capacity is desired, four planetary bevel gears maybe employed instead of two. Further, the input and output sides of the joint can be reversed to provide a speed increasing universal joint.

Accordingly, it is therefore an object of the present invention to provide an improved universal joint that combines speed reduction and a kinematic linkage in one joint.

Still another object of the present invention is to provide an improved speed reducing universal joint of both the single and double Cardan type where the ratio of the input to output rotational velocities may be easily varied by varying gear sizes.

BRIEF DESCRIPTION OF THE DRAWINGS

For more complete understanding of this invention, reference should now be made to the embodiments illustrated in greater detail in the accompanying drawings and described below by way of examples of the invention.

In the drawings:

FIG. 20 is a sectional view of the joint shown in FIG. 18;

FIG. 21 is a sectional view taken substantially along line 21—21 of FIG. 20;

FIG. 22 is a plan view of a universal joint made in accordance with the present invention and employing four planetary bevel gears and a drive ring; and FIG. 23 is a sectional view taken substantially along line 23—23 of FIG. 22.

Figure 1:
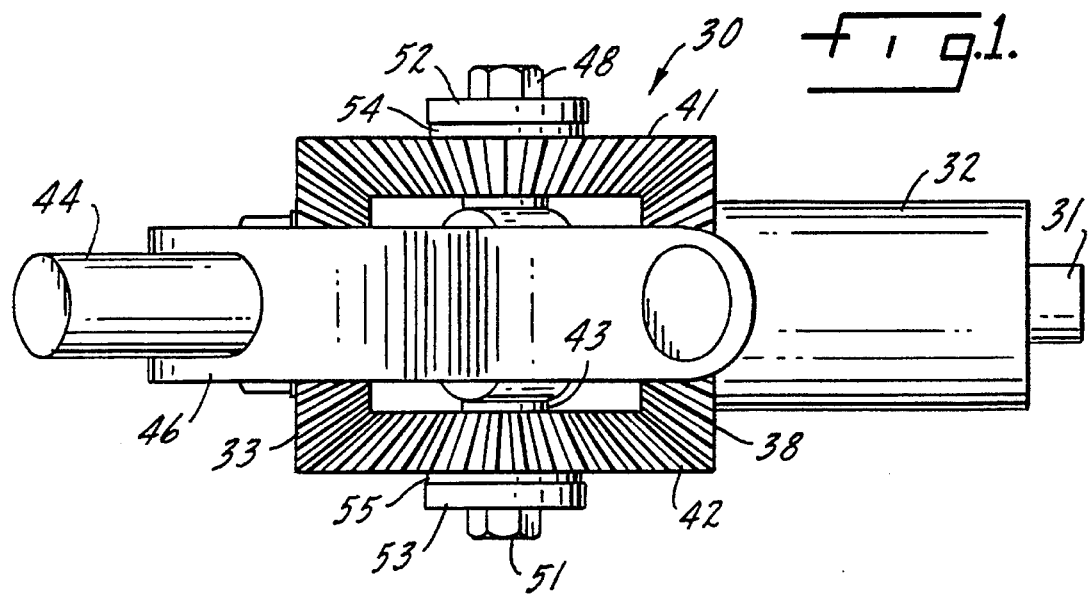
FIG. 1 is a plan view of a universal joint made in accordance with the present invention and particularly illustrating an embodiment with a drive cross.
Figure 2:
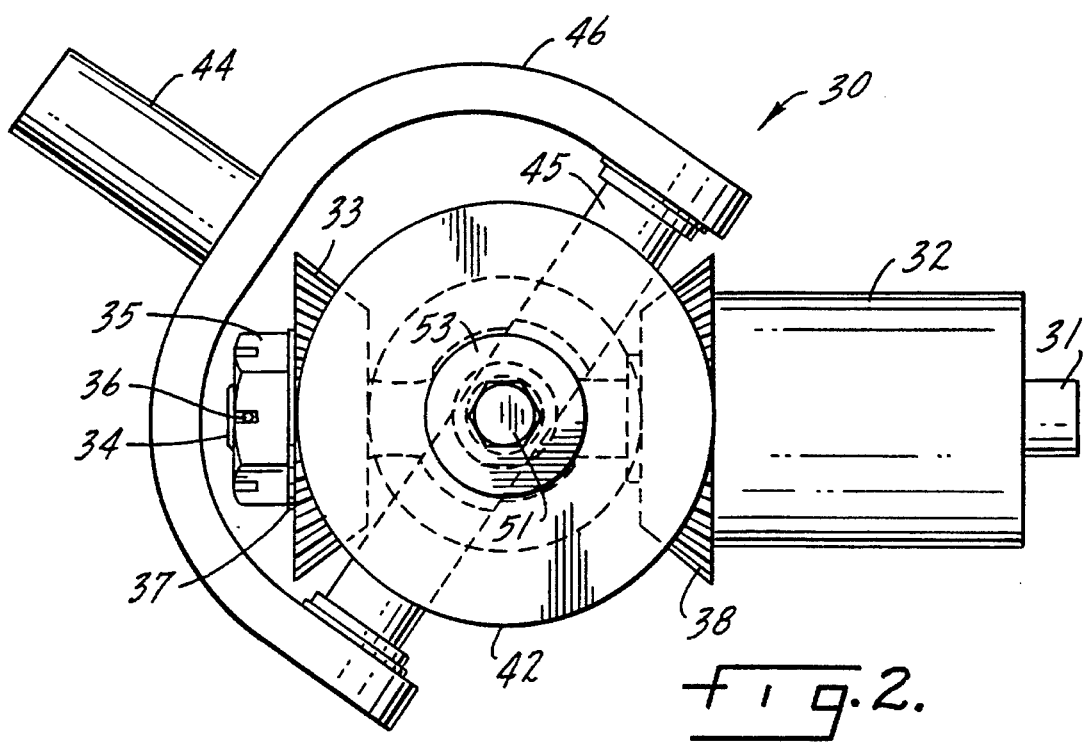
FIG. 2 is a front view of the joint shown in FIG. 1.
Figure 3:
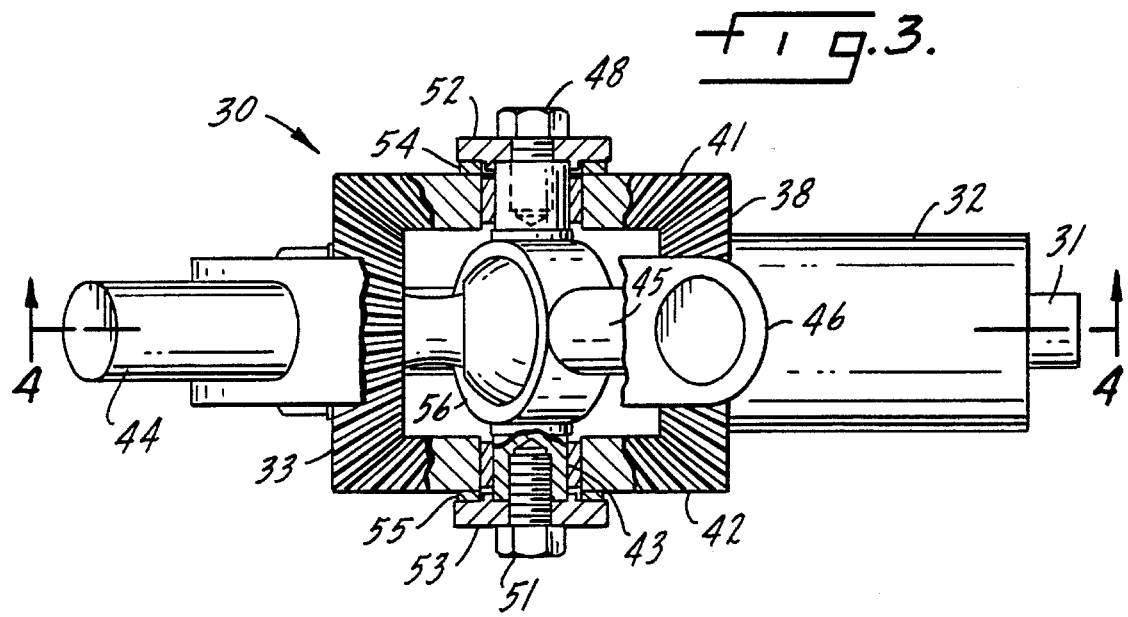
FIG. 3 is a sectional view of the joint shown in FIG. 1.
Figure 4:
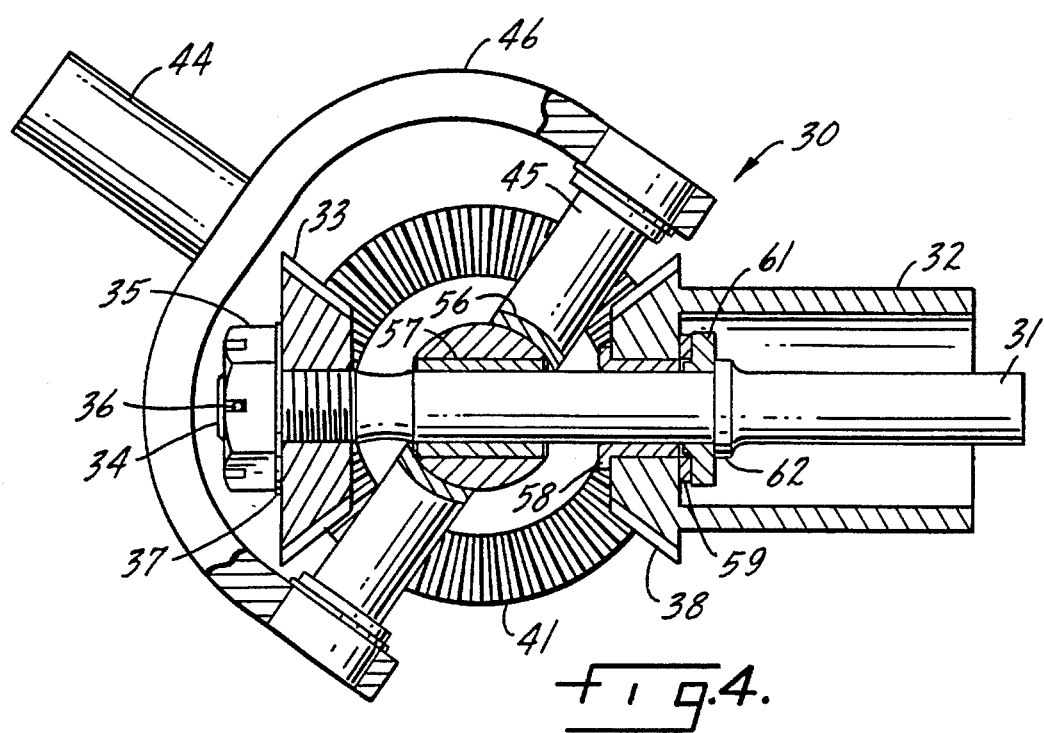
FIG. 4 is a sectional view taken substantially along line 4—4 of FIG. 3.

It should be understood that the drawings are not necessarily to scale and that the embodiment are sometimes illustrated by graphic symbols, phantom lines, diagrammatic representations and fragmentary views. In certain instances, details which are not necessary for understanding of the present invention or which render other details difficult to perceive may have been omitted. It should be understood, of course, that the invention is not necessarily limited to the particular embodiments illustrated herein.

DETAILED DESCRIPTION OF THE INVENTION

Like reference numerals will be used to refer to like or similar parts from Figure to Figure in the following description of the drawings.

The dramatic improvement contributed by the present invention is best understood after consideration of typical universal, Hooke's or Cardan joints and also in consideration of other universal joints currently available. First, the original universal joints included an input yoke perpendicularly connected to an output yoke via a cross member. The average output shaft velocity is equal to the average input shaft velocity; that is, universal, Hooke's and Cardan joints do not provide speed reduction or a lower output shaft velocity with increased torque.

Turning to FIGS. 1–5, a first joint 30 made in accordance with the present invention is presented. An input shaft 31 passes through a stationary housing 32. A drive bevel gear 33 is mounted on a distal end 34 of the input shaft 31 with a castle nut 35, cotter pin 36 and washer 37 or other equivalent attachment means. A fixed bevel gear 38 is attached to the end of the housing 32. Two planetary bevel gears 41, 42 (best illustrated in FIG. 1) simultaneously engage both the drive gear 33 and fixed gear 38. A planetary gear axle 43 (best illustrated in FIG. 3) passes through both planetary gears 41, 42 and around the input shaft 31 via the spherical bearing structure 56. Rotation of the input shaft 31 results in rotation of the drive gear 33 thereby resulting in rotation of both planetary gears 41, 42 about the fixed gear 38.

Rotational movement is transmitted to the output shaft 44 as follows. In the embodiment shown in FIGS. 1–5, the planetary gear axle 43 passes through the planetary gears 41, 42 is also connected to the second axle 45 (see FIG. 2) via the spherical bearing structure 56. Rotation of the planetary gears 41, 42 about the fixed gear 38 results in the angular rotation of both the planetary gear axle 43 and the secondary axle 45 about the fixed gear 38.

The secondary axle 45 is pivotally attached to the output yoke 46 which is fixedly attached to the output shaft 44. Therefore, rotation of the secondary axle 45 about the fixed gear 38 results in rotation of the output yoke 46 and the output shaft 44. The secondary axle 45 is pivotally attached to the output yoke 46. The connection between the input shaft 31, the planetary gear axle 43, the secondary axle 45, the output yoke 46 and the output shaft 44 constitutes a universal joint, i.e. a joint that can pivot within two intersecting and perpendicular planes.

The embodiment shown in FIGS. 1–5 includes the secondary axle 45 and the spherical bearing structure 56 as the means for connecting the planetary gear axle 43 to the output yoke 46 and output shaft 44. The combination of the secondary axle 45, planetary gear axle 43 and spherical bearing structure 56 is known as a drive cross. Another alternative for connecting the planetary gear axle 43 to the output shaft 44 is showing FIGS. 6 through 9 and is known as the drive ring 47. Comparing FIG. 6 with FIGS. 3 and 1, it is clear that the drive cross style of universal joint of the present invention requires less lateral clearance than the style incorporating the drive ring 47.

Returning to FIGS. 3 and 4, the planetary gear axle 43 passes through the planetary gears 41, 42 and is held in place by two bolts 48, 51 that pass through washers 52, 53. Additional thrust bearings are provided at 54, 55. The planetary gear axle 43 is not solid but includes the inner spherical bearing structure 56 through which the input shaft 31 passes. The spherical bearing structure 56 also accommodates bushing 57 that engage the rotating input shaft 31. The input shaft 31 passes through the bushing 58 and thrust bearing 59 which engages the inside diameter o the fixed gear 38. The washer 61 engages the flange 62 and maintains the axial position of the input shaft 31 with respect to the fixed gear 38. The secondary axle 45 is connected to the planetary gear axle 43 and the spherical bearing structure 56 to form the drive cross. The secondary axle 45 is also pivotally connected to the output yoke 46.

Figure 5:
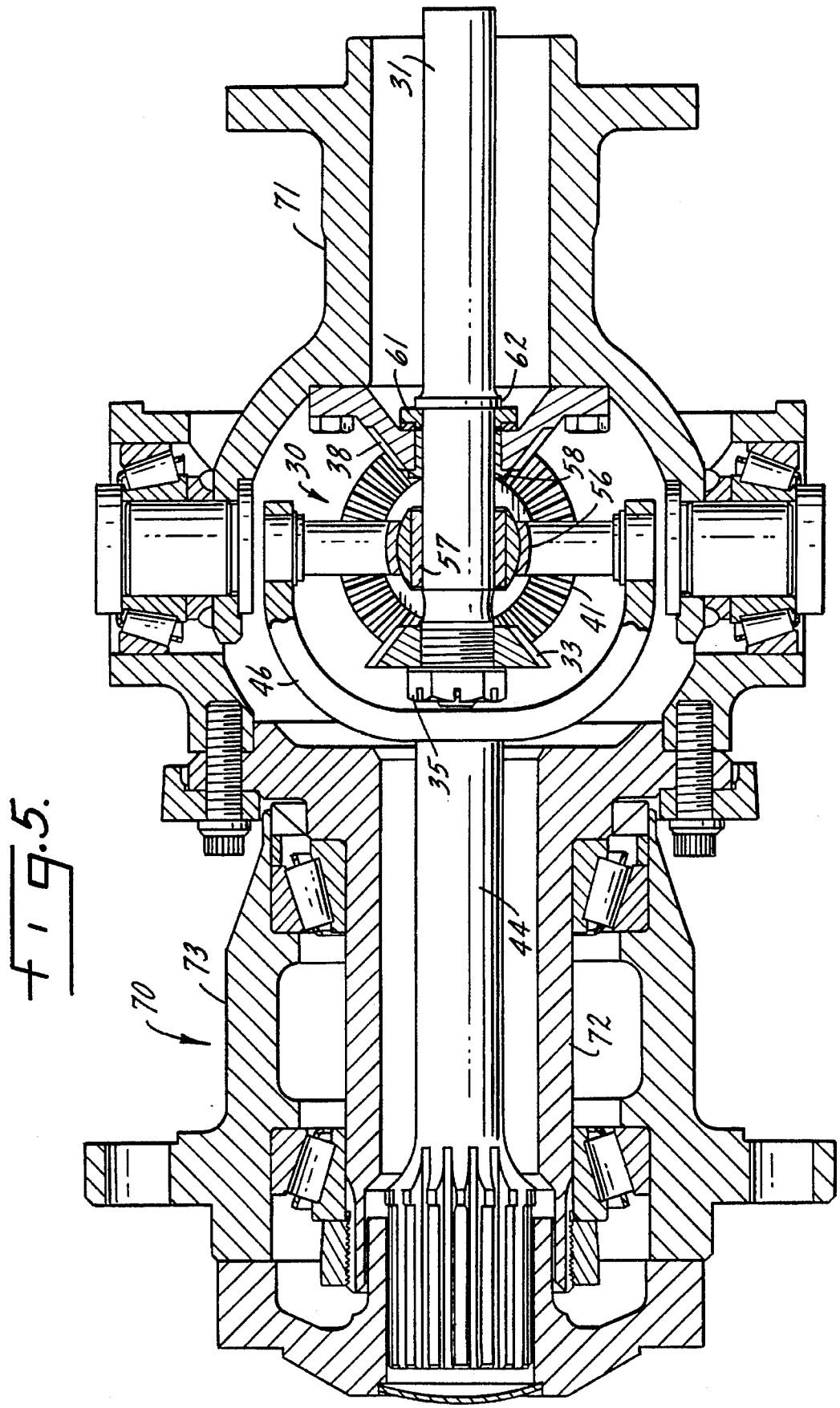
FIG. 5 is a sectional view of a drive/steer axle incorporating the joint shown in FIG. 1.

FIG. 5 is an illustration of the universal joint 30 as installed to a steerable wheel end 70. The fixed gear 38 is mounted to an axle housing 71 that accommodates the input shaft 31. The output shaft 44 passes through a spindle 72 which supports the rotating hub 73. Of course, the universal joint of the present invention can be applied to other mechanical power transmission equipment including but not limited to automotive power transmission componentry including gear boxes, drive hubs, drive shafts and steering systems. Other alternative uses will be apparent to those skilled in the art.

Figure 6:
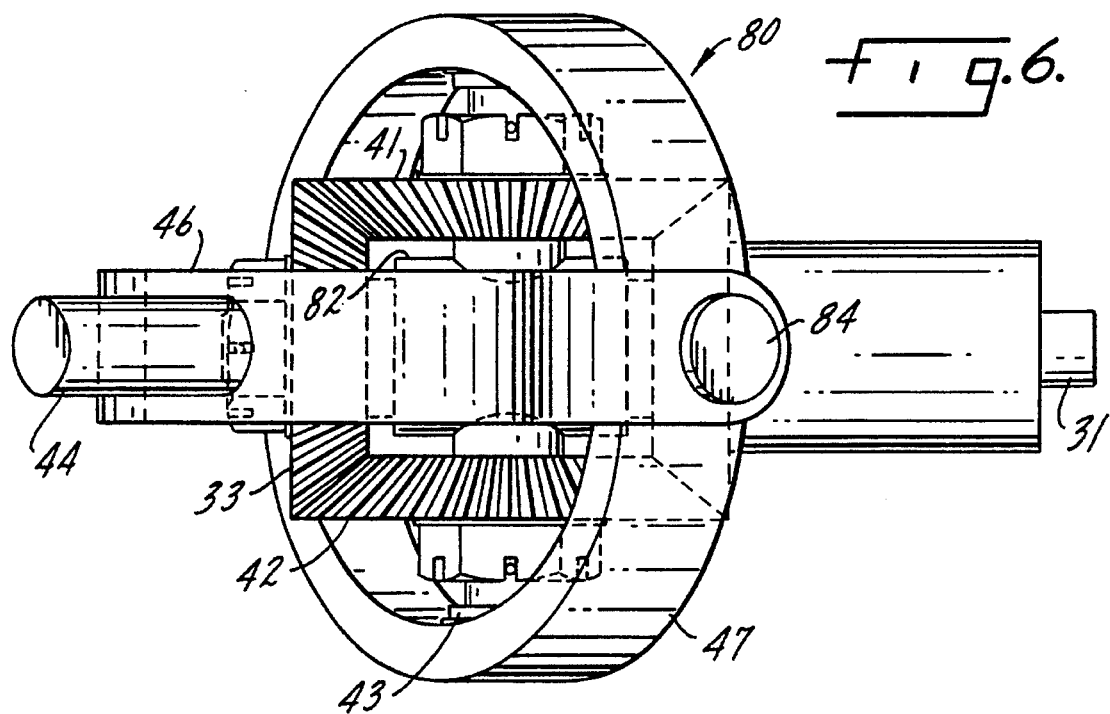
FIG. 6 is a plan view of a universal joint made in accordance of the present invention, particularly illustrating an embodiment with a drive ring.
Figure 7:
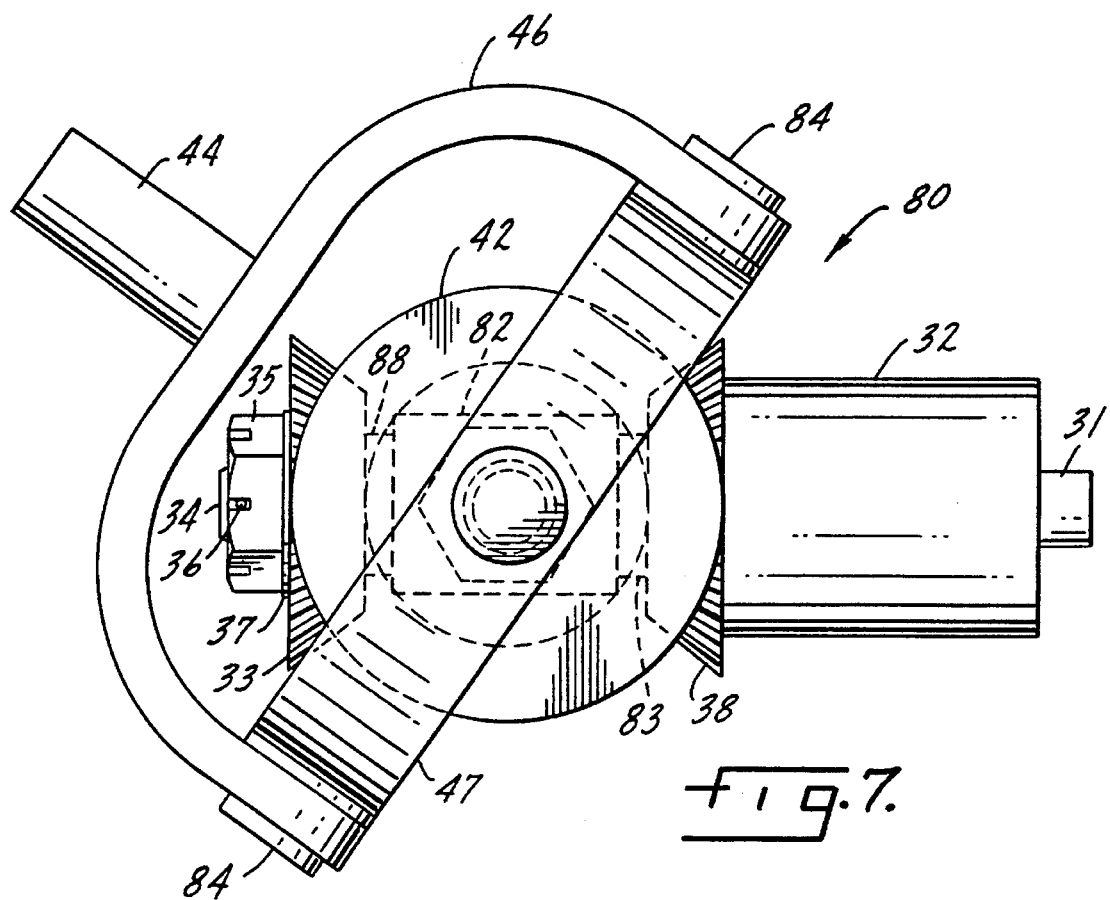
FIG. 7 is a front view of the joint shown in FIG. 6.
Figure 8:
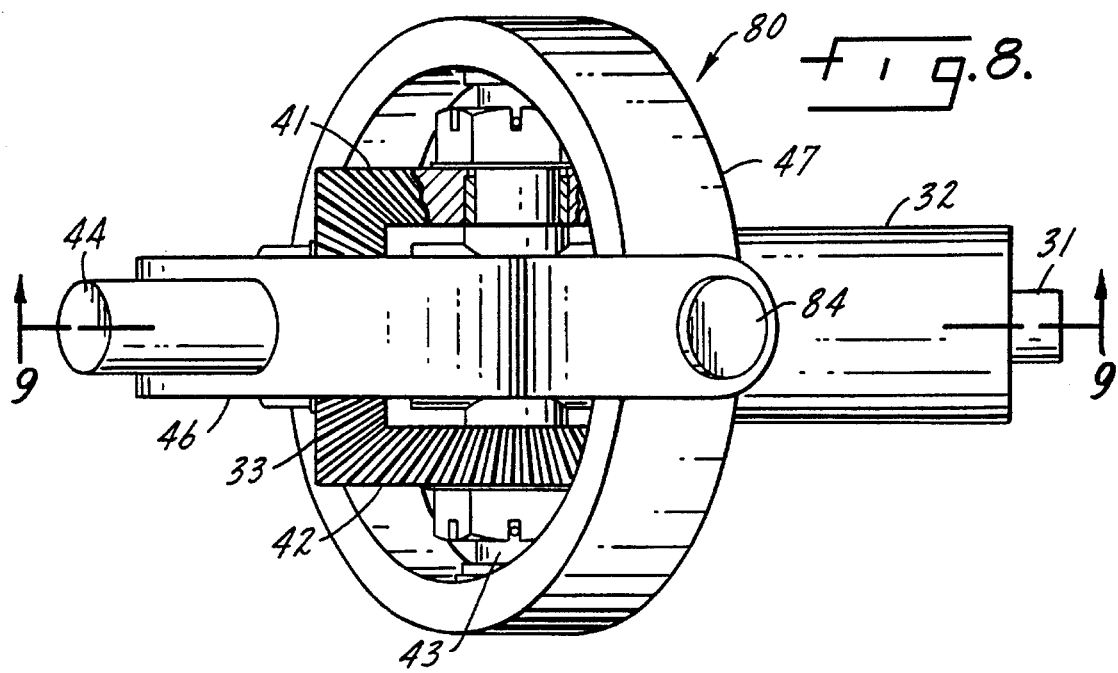
FIG. 8 is another plan view of the joint shown in FIG. 6.
Figure 9:
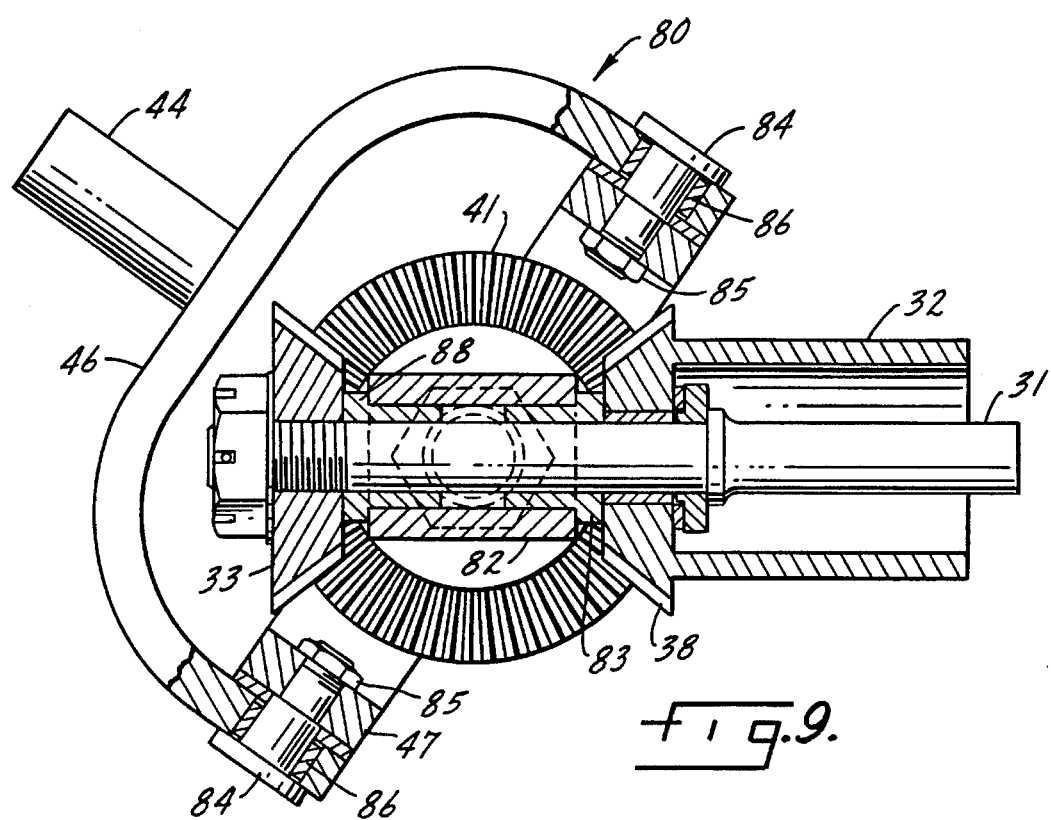
FIG. 9 is a sectional view taken substantially along line 9—9 of FIG. 8.
Figure 10:
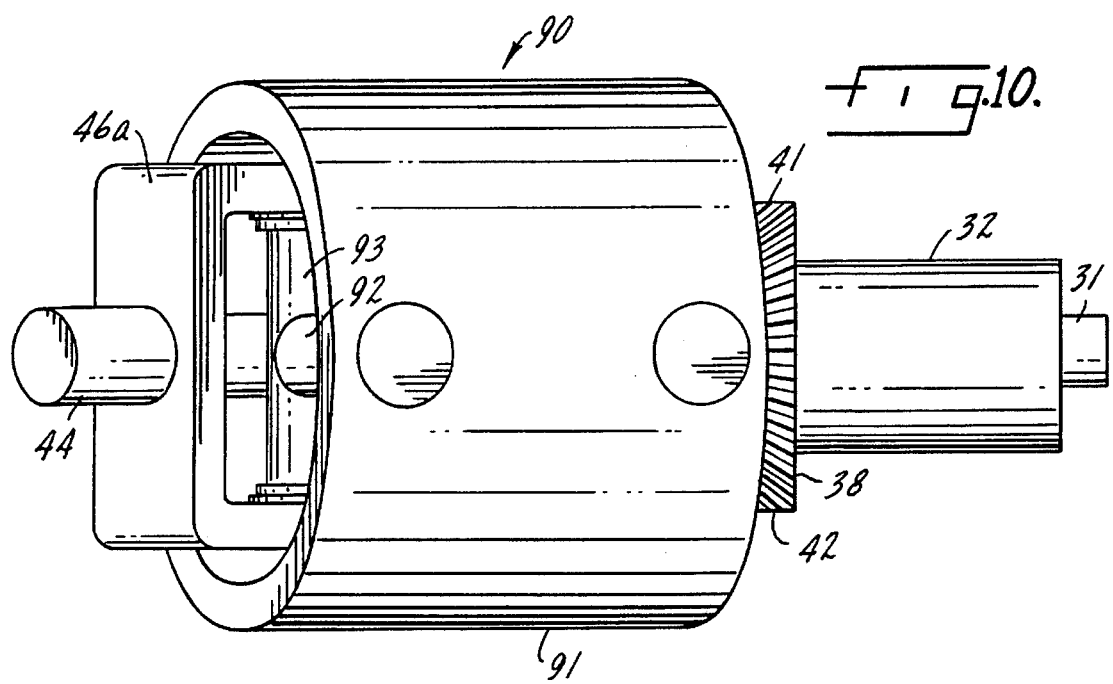
FIG. 10 is a plan view of the universal joint made in accordance with the present invention, particularly illustrating a double Cardan type joint.
Figure 11:
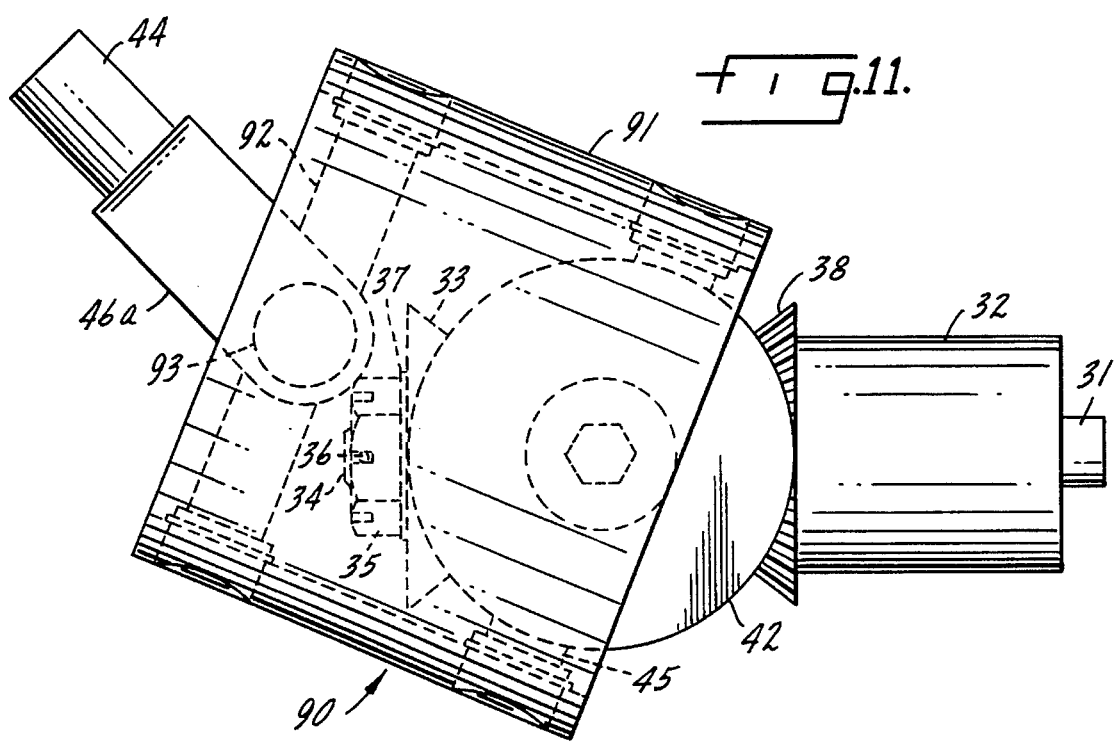
FIG. 11 is a front view of the joint shown in FIG. 10.
Figure 12:
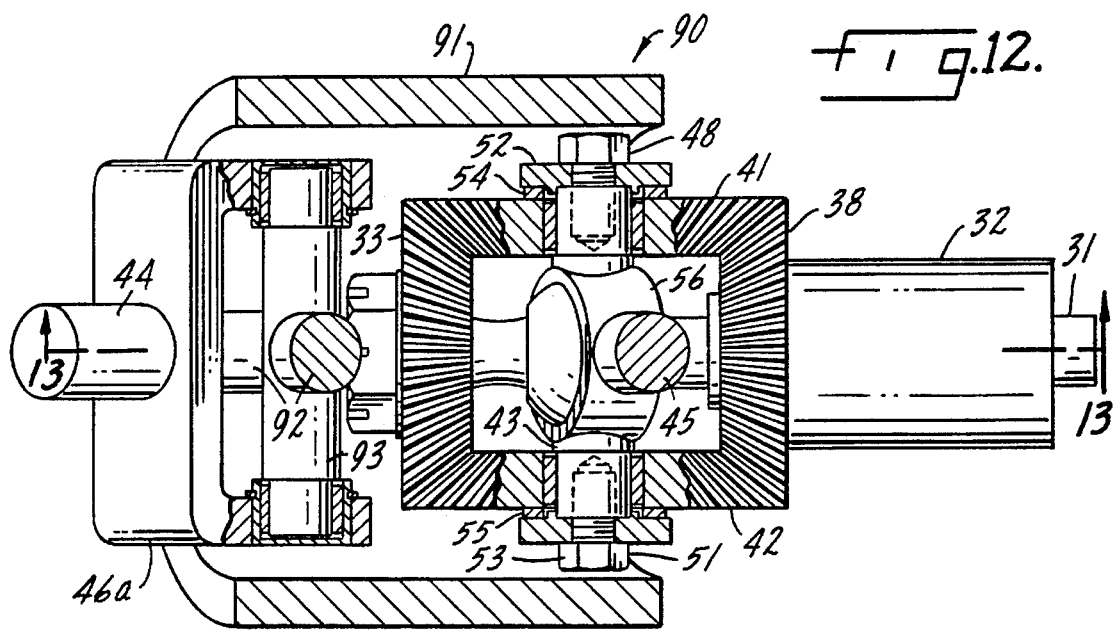
FIG. 12 is a sectional view of the joint shown in FIG. 10.
Figure 13:
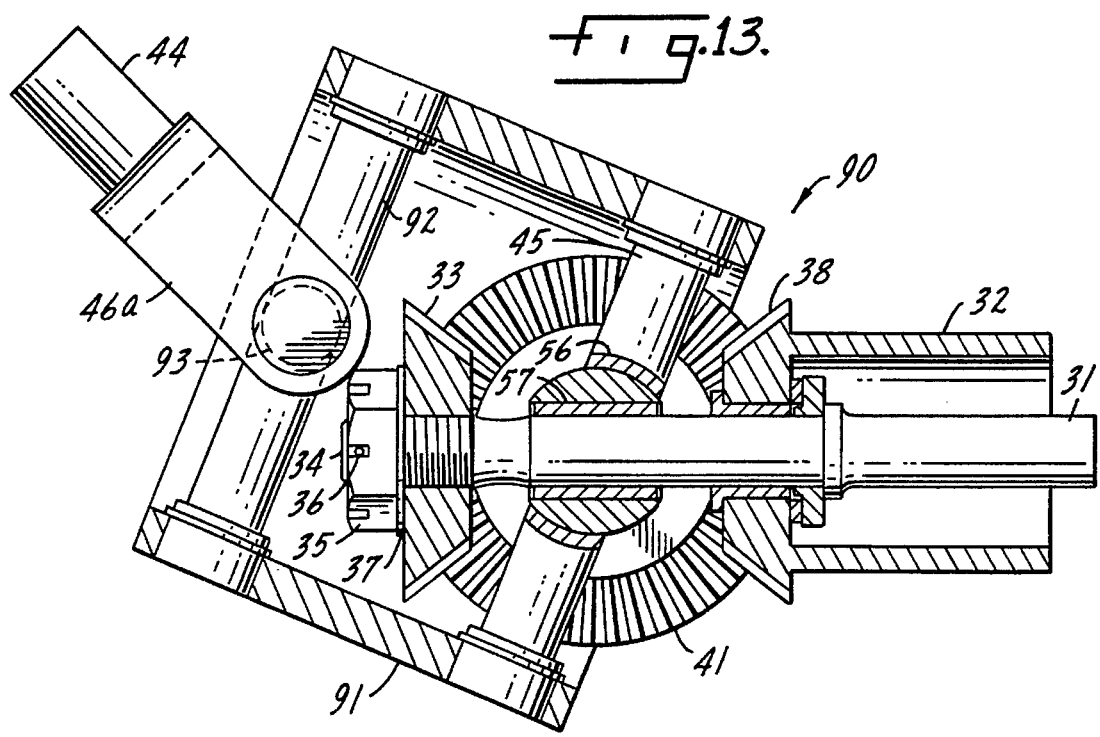
FIG. 13 is a sectional view taken substantially along line 13—13 of FIG. 12.
Figure 14:
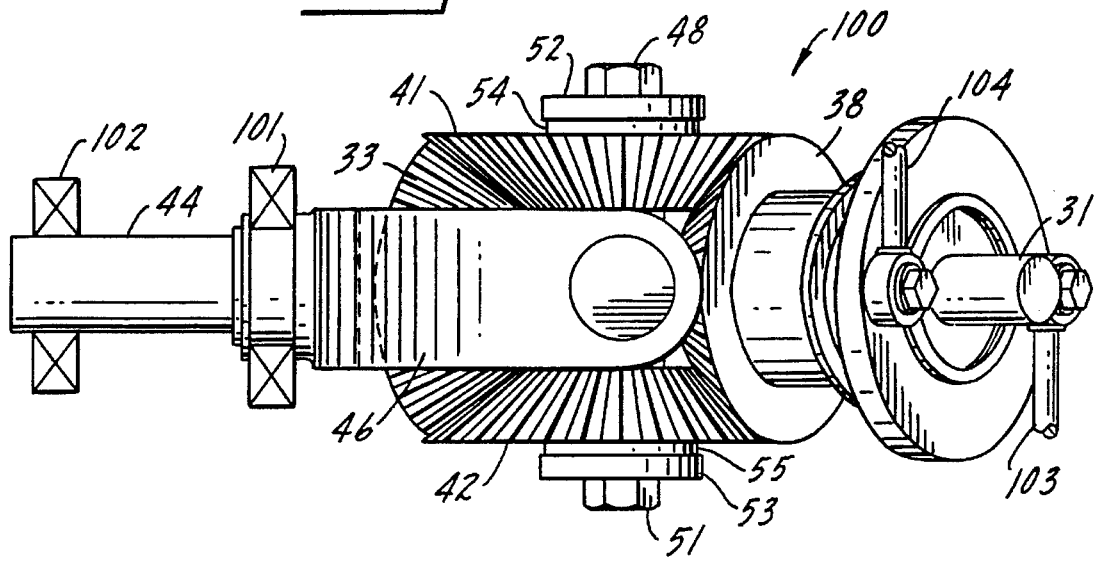
FIG. 14 is a plan view of a universal joint made in accordance with the present invention, similar to the universal joint shown in FIG. 1 but with a movable input shaft and a fixed output shaft.
Figure 15:
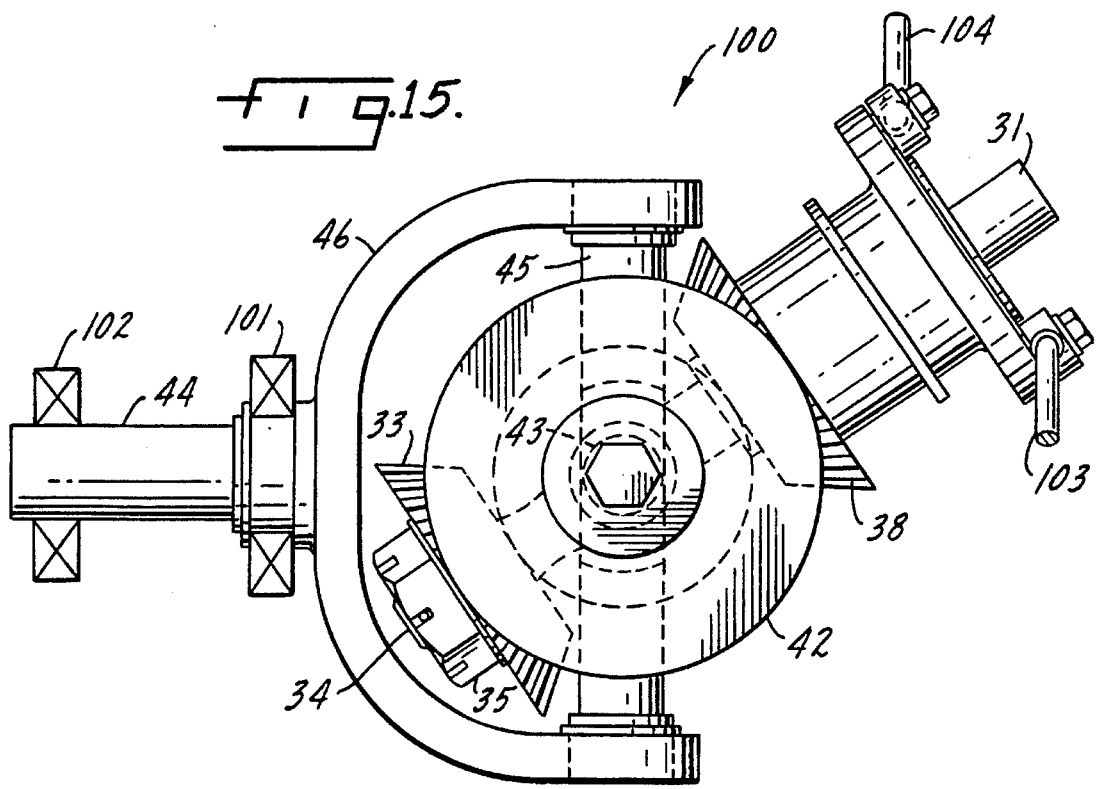
FIG. 15 is a front view of the universal joint shown in FIG. 14.
Figure 16:
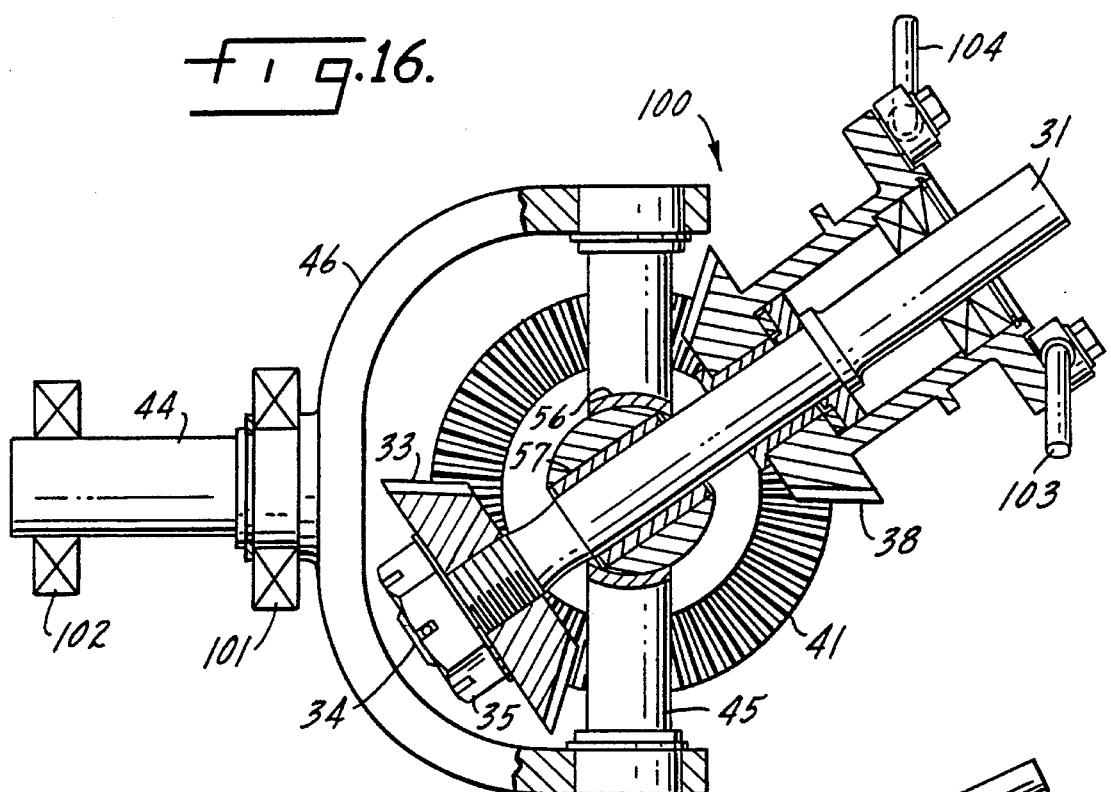
FIG. 16 is a sectional view of the universal joint shown in FIG. 14.

Turning to FIG. 6, an alternative universal joint 80 is illustrated that incorporate a drive ring 47 as opposed to the drive cross (i.e., the combination of the planetary gear axle 43, secondary axle 45 and spherical bearing structure 56 as shown in FIGS. 1–5). The drive ring 47 of FIGS. 6–9 is connected to the distal ends of the planetary gear axle 43 and serves as a means to transmit the rotational velocity of the planetary gear axle 43 which is driven by the planetary gears 41, 42 to the output yoke 46 and to the output shaft 44. The universal joint 80 also includes a cylindrical bearing structure 82 which supports the planetary gear axle 43 about the input shaft 31. The input shaft 31 also passes through a combination bushing and spacers shown at 83, 88. The drive ring 47 may be pivotally attached to the output yoke 46 with a bolt 84, nut 85 and bushing 86 (see FIG. 9; not shown in FIG. 6) or other similar attachment means that will be readily apparent to those skilled in the art. FIG. 8 and 9 present additional views of the joint 80 shown in FIGS. 6 and 7.

The speed reduction capabilities of the embodiments shown in FIGS. 1–9 is illustrated as follows. For a planetary gear arrangement as shown in FIGS. 1 through 9, $$\omega_i = \omega_o \left[ 1 + \frac{C}{y} \cdot \frac{x}{B} \right] \quad (1)$$

where $\omega_o$=the rotational velocity of output shaft 44;

$\omega_i$=the rotational velocity of input shaft 31;

C=the number of teeth of the fixed gear 38;

B=the number of teeth of the drive gear 33;

x=the number of teeth of the planetary gear 41 or 42 that engages the drive gear 33; and y=the number of teeth of the planetary gear 41 or 42 that engages the fixed gear 38.

Because, in FIGS. 1–9, B=C and x=y, $\omega_i = 2\omega_o$ and therefore $\omega_o = \frac{1}{2} \omega_i$. Accordingly, the universal joint 30 of FIGS. 1–5 and the universal joint 80 of FIGS. 6–9 are speed reducing universal joints with an input to output ratio of 2:1. The size of the planetary bevel gears 41, 42 does not effect the speed reduction ratio. A constant input rotational velocity results in an average output rotational velocity of one-half of the input rotational velocity.

Referring now to FIGS. 10 through 13, a double Cardan joint 90 is illustrated that results in an output shaft 44 having a constant rotational velocity given a constant rotational velocity of input shaft 31 and equal operating angles of the individual Cardan joints. Essentially, the joint 90 is a single Cardan joint made in accordance with the joint shown in FIGS. 1 through 5 connected by a coupling link 91 to a traditional single Cardan joint formed by a third axle 92 which is perpendicularly connected to a fourth axle 93 and the fourth axle 93 is thereafter connected to an output yoke 46a which is fixedly connected to the output shaft 44.

In comparing FIGS. 1 through 5 with FIGS. 10 through 13, the reader will note that, in FIGS. 1 through 5, the secondary axle 45 is connected directly to the output yoke 46. In contrast, in FIGS. 10 through 13, secondary axle 45 is connected to the coupling link 91 which is thereafter connected to a third axle 92 which is then perpendicularly connected to a fourth axle 93 which is connected to the output yoke 46a. The connection to the output yoke 46 (or 46a in the case of FIGS. 10 through 13) has been shifted 90°.

Because equation (1) above applies equally to single Cardan and double Cardan joints and because B=C for the embodiment illustrated in FIGS. 10–13, the rotational velocity of the output shaft 44 will equal one-half (½) the rotational velocity of the input shaft 31.

Although FIGS. 10–13 illustrate double Cardan drive cross type joints, double Cardan drive ring joints will also be apparent to those skilled in the art.

Figure 17:
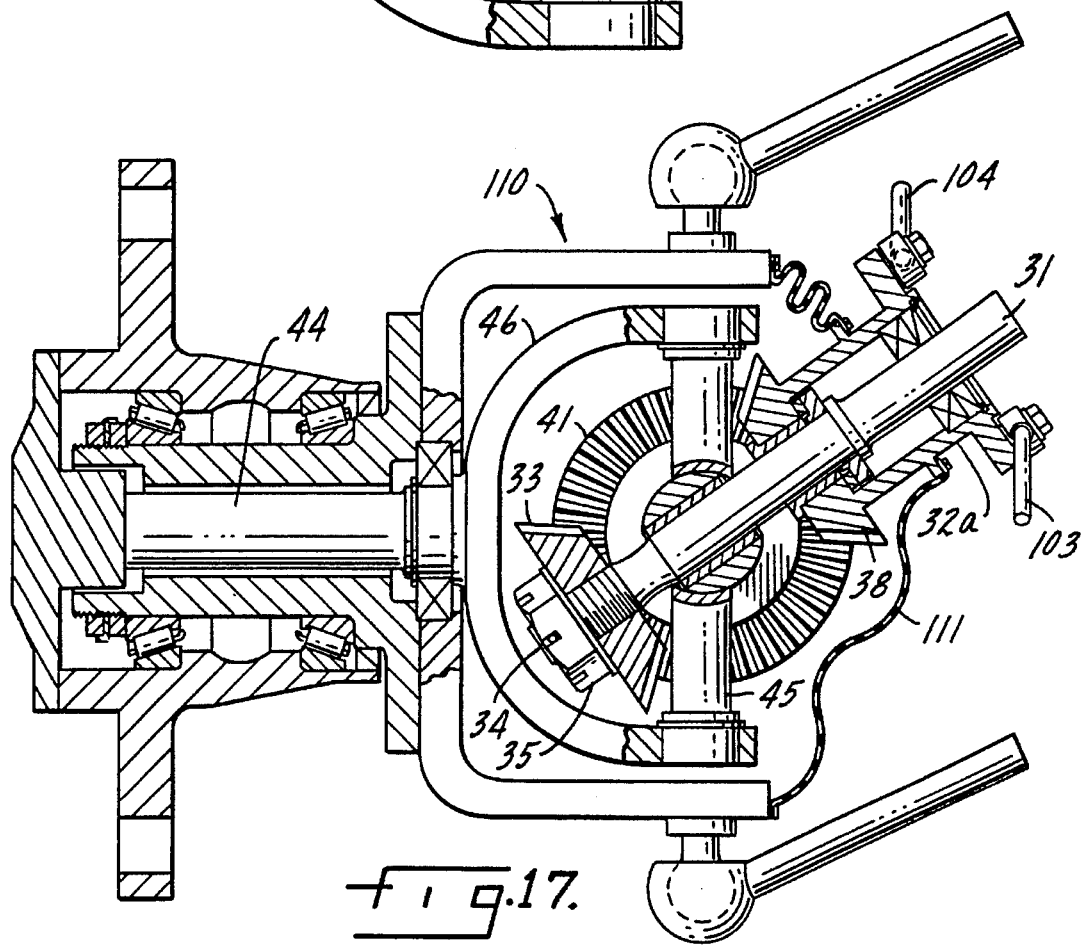
FIG. 17 is a sectional view illustrating a universal joint similar to the one shown in FIG. 14 as incorporated into an independent wheel end.
Figure 18:
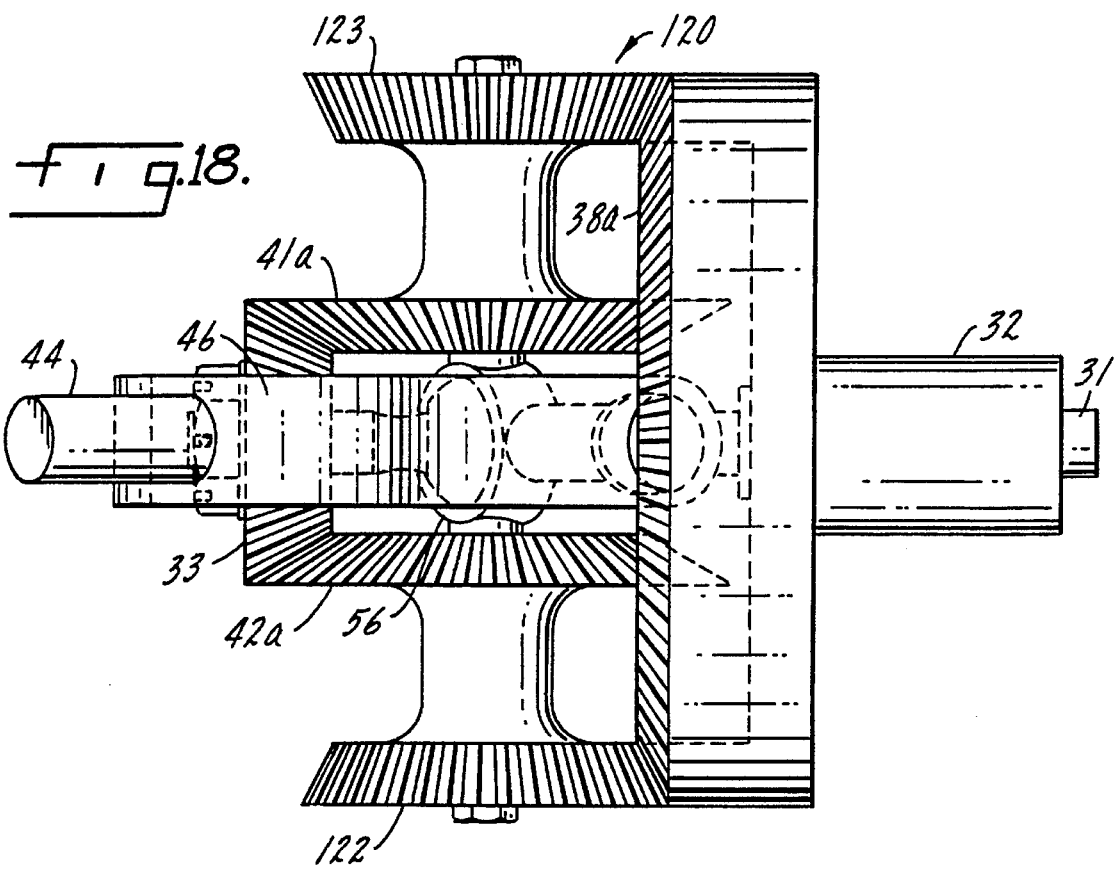
FIG. 18 is a plan view of yet another universal joint made in accordance with the present invention illustrating compound planetary gears for additional speed reduction across the joint.
Figure 19:
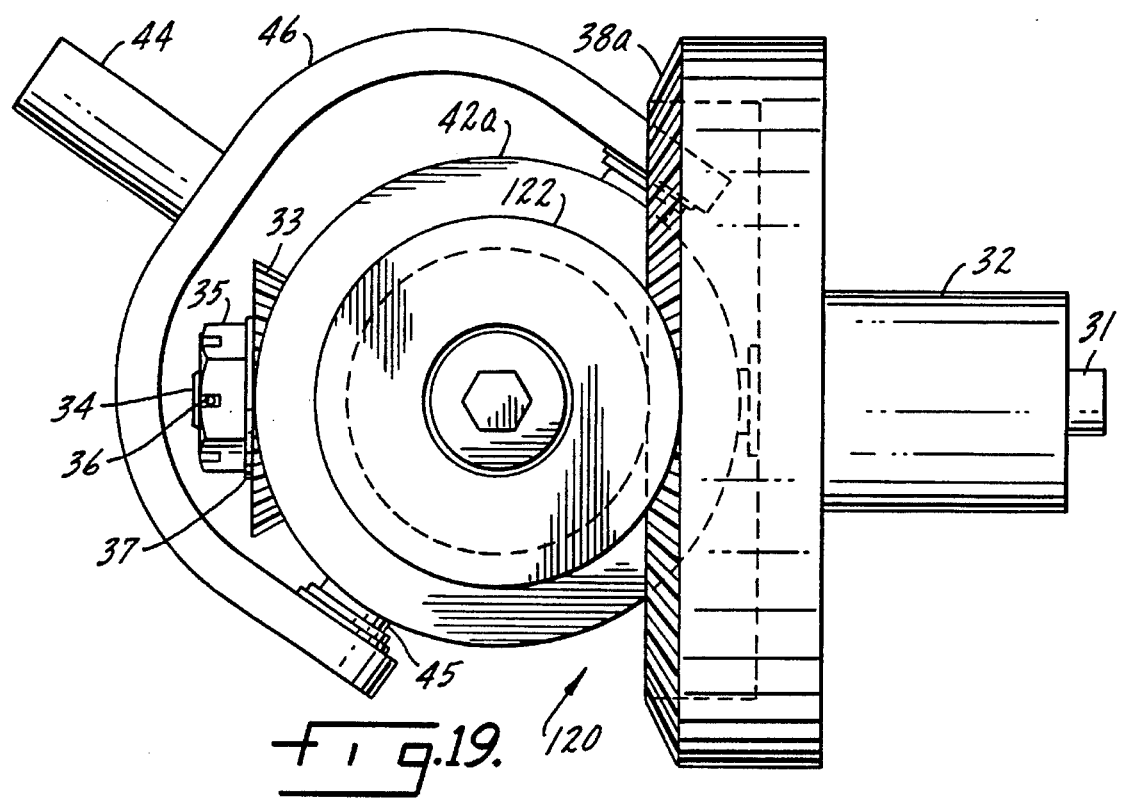
FIG. 19 is a front view of the joint shown in FIG. 18.

FIGS. 14–23 illustrate variations of the present invention that can be used depending upon the application. FIGS. 14–17 illustrate the use of a universal joint 100 such as the one shown in FIGS. 1 through 6 except that the output shaft 44 is held in place by supports 101, 102 and the input shaft 31 is allowed to pivot. Anti-rotation links 103, 104 keep the fixed gear 38 from rotating while it and the input shaft 31 pivot about the universal joint center. Turning to FIG. 17, a joint 110 similar to the one shown at 100 in FIGS. 14–17 is used in connection with an independent wheel end. A boot 111 is employed to retain lubricant. The input shaft housing 32a is free to pivot or oscillate about the universal joint 110 center but cannot rotate because of anti-rotation links 103, 104. The 2:1 speed reduction feature applies to this variation.

FIGS. 18–21 illustrate the universal joint 120 with a compound planetary gear system. A drive gear 33 is attached to the input shaft 31. A larger fixed gear 38a is attached to the fixed housing 32. The planetary bevel gears 41a, 42a rotate about the drive gear 33 but do not engaged the fixed gear 38a. Instead, the compound planetary gears 122, 123 (attached to 41a, 42a) rotate about the fixed gear 38a. The fixed gear 38a is larger than the planetary gears 122, 123 and the planetary gears 41a, 42a are also larger than the drive gear 33 and therefore the universal joint 120 shown in FIGS. 18 through 21 provides a double speed reduction ratio along the lines of up to 10:1 as opposed to the 2:1 speed reduction ratio of FIGS. 1 through 9. For example, in FIGS. 18–21, applying equation (1) below:

$$\omega_i = \omega_o \left[ 1 + \frac{C}{y} \cdot \frac{x}{B} \right] \quad (1)$$

and $\omega_o$=the rotational velocity of output shaft 44;

$\omega_i$=the rotational velocity of input shaft 31;

C=the number of teeth of the fixed gear 38a;

B=the number of teeth of the drive gear 33;

x=the number of teeth of the planetary gear 41a, 42a engaging the drive gear 33;

y=the number of teeth of the planetary gear 122, 123 engaging the fixed gear 38a.

If, for example, B=20, C=90, X=60, Y=30, then $\omega_i$=10$\omega_i$ and $\omega_o$=1/10$\omega_i$.

Double Cardan joints involving double reduction compound planetary bevel gears will also be apparent to those skilled in the art.

Turning to FIGS. 22 and 23, a universal joint 130 is illustrated that employs a drive ring 47 like the one shown in FIGS. 6 through 9 but includes four planetary gears 41, 42, 131, 132 (see also FIG. 23). Utilizing four planetary gears 41, 42, 131, 132 provides a higher torque carrying capacity. The torque is transferred through one planetary axle 43b to drive ring 47. The drive ring connection to the output yoke 46 and the connection to the output shaft 44 are similar to that shown FIGS. 6 through 9.

Thus, an improved universal joint is illustrated that combines the flexible power transmission capabilities of a universal joint with speed reduction previously supplied by a separate gear system. Universal joints with speed reduction ratios ranging from 2:1 have been illustrated and ratios ranging from 2:1 through 10:1 are available using the teachings of the present invention. Finally, reversing the input and output shafts will provide a speed increasing universal joint.

Although, only seven embodiments have been illustrated and described, it will be apparent to those skilled in the art that variations maybe made within the spirit and scope of the invention. Accordingly, it is intended that the scope of the invention be limited solely by the scope of the hereafter appended claims and not by any specific wording in the foregoing description.

I claim:

1. A universal joint for rotatably transmitting power from an input shaft to an output shaft, the input and output shaft being pivotal with respect to one another, the universal joint comprising:

a drive gear mounted on a distal end of the input shaft, a fixed gear mounted on a distal end of a housing, the input shaft passing through the housing and through the fixed gear, the fixed gear being disposed along the input shaft in a spaced relationship with the drive gear, a planetary gear axle passing through two opposing planetary gears, means for connecting the planetary gear axle to the output shaft, the two opposing planetary gears being disposed between and simultaneously meshing with both the fixed and drive gears, rotation of the input shaft resulting in rotation of the drive gear thereby resulting in rotation of the opposing planetary gears about the fixed gear thereby resulting in rotation of the planetary gear axle and the output shaft.

2. The universal joint of claim 1, wherein the means for connecting the planetary gear axle to the output shaft includes a second axle connected to the planetary gear axle in a substantially perpendicular fashion, the second axle being connected to the output shaft.

3. The universal joint of claim 2, wherein the second axle being further characterized as being pivotally connected to a yoke, the yoke being connected to the output shaft.

4. The universal joint of claim 2, wherein the combination planetary gear axle and the second axle being further characterized as a first drive cross.

5. The universal joint of claim 4, wherein the second axle of the first drive cross being pivotally connected to a coupling link, the coupling link being pivotally connected to a second drive cross having a third axle and a fourth axle, the third axle being pivotally connected to the coupling link and the fourth axle being connected to output shaft, the third and fourth axle being substantially perpendicular to one another.

6. The universal joint of claim 5, wherein the fourth axle of the second drive cross being disposed substantially perpendicular to the second axle of the first drive cross.

7. The universal joint of claim 6, wherein the fourth axle being pivotally connected to a yoke which being connected to the output shaft.

8. The universal joint of claim 1, wherein the means for connecting the planetary gear axle to the output shaft includes a first drive ring, the planetary gear axle passing through and being pivotally connected to the first drive ring.

9. The universal joint of claim 8, wherein the first drive ring is pivotally connected to a yoke at an angle perpendicular to the planetary gear axis, the yoke being connected to the output shaft.

10. The universal joint of claim 1, wherein the drive, fixed and both planetary gears are bevel gears of substantially similar sizes.

11. The universal joint of claim 10, wherein the average rotational velocity of the output shaft is about one-half the rotational velocity of the input shaft.

12. The universal joint of claim 1, wherein the output shaft passes through a spindle, the spindle and housing being connected together.

13. The universal joint of claim 1, wherein the input shaft passes through the planetary gear axle and is permitted to pivot while rotating, the output shaft being free to rotate while being fixed in space.

14. The universal joint of claim 1, wherein the means for connecting the planetary gear axle to the output shaft includes a second axle connected perpendicularly to the planetary gear axle, the second axle is connected to a coupling link, the coupling link being connected to a third axle, a fourth axle is connected perpendicularly to the third axle, the fourth axle being pivotally connected to the output shaft.

15. A universal joint for rotatably transmitting power from an input shaft to an output shaft, the input and output shaft being pivotable with respect to one another, the universal joint comprising:

a drive gear mounted on a distal end of the input shaft, a fixed gear mounted on a distal end of a fixed housing, the input shaft passing through the fixed housing and through the fixed gear, the fixed gear being disposed along the input shaft in a spaced relationship with the drive gear, a drive cross including two substantially perpendicular axle, a first planetary gear axle passing through two opposing planetary gears and a second axle being pivotally connected to a yoke, the yoke being connected to the output shaft, the two opposing planetary gears being disposed between and simultaneously meshing with both the fixed and drive gears, rotation of the input shaft resulting in rotation of the drive gear thereby resulting in rotation of the opposing planetary gears about the fixed gear thereby resulting in rotation of the drive cross and the second axle of the drive cross thereby resulting in rotation of the yoke and the output shaft.

16. A double Cardan joint for rotatably transmitting power from an input shaft to the output shaft, the input and output shaft being pivotable with respect to one another, the double Cardan joint comprising:

a drive gear mounted on a distal end of the input shaft, a fixed gear mounted on a distal end of a fixed housing, the input shaft passing through the fixed housing and through the fixed gear, the fixed gear being disposed along the input shaft in a spaced relationship with the drive gear, a first drive cross including two substantially perpendicular axle, a first planetary gear axle passing through two opposing planetary gears and a second axle being connected to a coupling link, the two opposing planetary gears being disposed between and simultaneously meshing with both the fixed and drive gears, the coupling link being pivotally connected to a second drive cross having a third axle and a fourth axle, the third axle being pivotally connected to the coupling link and the fourth axle being pivotally connected to a yoke, the yoke being connected to the output shaft, the third and fourth axle being substantially perpendicular one another, the fourth axle of the second drive cross being disposed substantially perpendicular to the second axle of the first drive cross, rotation of the input shaft resulting in rotation of the drive gear thereby resulting in rotation of the opposing planetary gears about the fixed gear thereby resulting in rotation of the first drive cross, the coupling link, the second drive cross, the yoke and the output shaft.

17. A universal joint for rotatably transmitting power from an input shaft to an output shaft, the input and output shaft being pivotable with respect to one another, the universal joint comprising:

a drive gear mounted on a distal end of the input shaft, a fixed gear mounted on a distal end of a fixed housing, the input shaft passing through the fixed housing and through the fixed gear, the fixed gear being disposed along the input shaft in a spaced relationship with the drive gear, a planetary gear axle passing through a drive ring and two opposing planetary gears, the drive ring pivotally connecting the planetary gear axle to a yoke which is connected to the output shaft, the two opposing planetary gears being disposed between and simultaneously meshing with both the fixed and drive gears, rotation of the input shaft resulting in rotation of the drive gear thereby resulting in rotation of the opposing planetary ears, the planetary gear axle and the drive ring about the fixed gear thereby resulting in rotation of the yoke and the output shaft.

* * * * *